(12) United States Patent
Tuovinen et al.

(10) Patent No.: US 10,088,906 B2
(45) Date of Patent: Oct. 2, 2018

(54) METHOD AND APPARATUS FOR RECOGNIZING SWIPE OPERATION OF A USER ON A USER INTERFACE

(71) Applicant: Joyhaptics Oy, Espoo (FI)

(72) Inventors: Jussi Tuovinen, Espoo (FI); Mika Koskenvuori, Espoo (FI); Jukka Kangas, Oulu (FI)

(73) Assignee: JOYHAPTICS OY, Espoo (FI)

( * ) Notice: Subject to any disclaimer, the term of this patent is extended or adjusted under 35 U.S.C. 154(b) by 147 days.

(21) Appl. No.: 15/343,344

(22) Filed: Nov. 4, 2016

(65) Prior Publication Data

US 2017/0139480 A1 May 18, 2017

Related U.S. Application Data

(60) Provisional application No. 62/253,174, filed on Nov. 10, 2015.

(51) Int. Cl.
| | |
|---|---|
| *G06F 3/01* | (2006.01) |
| *G06F 3/041* | (2006.01) |
| *G06F 3/043* | (2006.01) |
| *G06F 3/046* | (2006.01) |

(52) U.S. Cl.
CPC ............ *G06F 3/016* (2013.01); *G06F 3/014* (2013.01); *G06F 3/043* (2013.01); *G06F 3/046* (2013.01); *G06F 3/0414* (2013.01); *G06F 3/0416* (2013.01); *G06F 2203/04101* (2013.01)

(58) Field of Classification Search
CPC ........ G06F 3/014; G06F 3/0414; G06F 3/043; G06F 3/046; G06F 3/0416
See application file for complete search history.

(56) References Cited

U.S. PATENT DOCUMENTS

| | | | |
|---|---|---|---|
| 2007/0119698 A1* | 5/2007 | Day ........................ | G06F 3/038 200/510 |
| 2010/0013775 A1* | 1/2010 | Son ........................ | G06F 3/0414 345/168 |
| 2013/0018489 A1* | 1/2013 | Grunthaner ............. | G06F 3/041 700/73 |
| 2014/0267039 A1* | 9/2014 | Curtis .................... | G06F 3/0338 345/161 |

(Continued)

*Primary Examiner* — Kevin M Nguyen
(74) *Attorney, Agent, or Firm* — Ziegler IP Law Group, LLC (57) ABSTRACT

A method and apparatus system for recognizing touch operation of a user on a user interface. The apparatus includes a housing including an at least one characteristic surface; a vibration detector to detect vibrations generated on interaction of the user with the characteristic surface; a proximity detector to detect deformations generated on the interaction of the user with the characteristic surface; a processor to process the vibrations obtained from the vibration detector to determine a vibration pattern specific to the interaction of the user on the characteristic surface and to process the detected deformation related information to determine a force applied by the user to the characteristic surface; a controller to identify and process an instruction to control an operation of a device in accordance with the vibration pattern and the detected deformation; and a communication interface to communicate the instruction to the device.

11 Claims, 5 Drawing Sheets

(56) References Cited

U.S. PATENT DOCUMENTS

2015/0293592 A1* 10/2015 Cheong .................. G06F 3/016
 345/173
2016/0063828 A1* 3/2016 Moussette ................ G08B 6/00
 340/540

* cited by examiner

FIG. 5B

METHOD AND APPARATUS FOR RECOGNIZING SWIPE OPERATION OF A USER ON A USER INTERFACE

CROSS-REFERENCE TO RELATED APPLICATIONS

This application claims priority to and the benefit of U.S. Provisional Patent Application No. 62/253,174, filed on 10 Nov. 2015, the disclosure of which is incorporated herein by reference in its entirety.

TECHNICAL FIELD

The present disclosure relates generally to user input related interfaces; and more specifically, to a method and apparatus for recognizing touch operation of a user on a user interface.

BACKGROUND

A user input is a critical aspect in an electronic device so that the user can control the operations of the electronic device. There exist various prior art techniques in order to receive input from the user for the electronic device. For example, touch based sensors (i.e., touch screens) are extensively used in the electronic device for example a mobile phone so that the user can provide his input with an ease and comfort. However, miniaturization of the electronic device (e.g., earphone) has reduced the screen area for the user interfaces and consequently, created discomfort to the user to provide input for the electronic device. In another prior art technique, motion based sensors are used to detect the user input. However, the motion based sensors are not applicable for general control use. Also the feeling related to touch is an important component of functionality; if the surface of the touch device is clearly recognizable by finger only, no visual feedback is needed for recognizing the touch surface and different control areas are separable. Additionally it would be beneficial that the touch surface would not need to have any electrical properties, and could be of any shape and size.

Therefore, in light of the foregoing discussion, there exists a need to overcome the aforementioned drawbacks for receiving user input for the electronic device.

SUMMARY

The present disclosure seeks to provide an apparatus for recognizing touch operation of a user on a user interface.

In another aspect, an embodiment of the present disclosure provides an apparatus for recognizing touch operation of a user on a user interface, the apparatus comprising:

a housing including an at least one characteristic surface;

a vibration detector configured to detect vibrations that are generated on interaction of the user with the at least one characteristic surface;

a proximity detector configured to detect deformations that are generated on the interaction of the user with the at least one characteristic surface;

a processor to process the vibrations obtained from the vibration detector to determine a vibration pattern specific to the interaction of the user on the at least one characteristic surface and to process the detected deformation related information to determine a force applied by the user to the at least one characteristic surface;

a controller to identify and process at least one instruction to control at least one operation of a device in accordance with the vibration pattern and the detected deformation; and a communication interface to communicate the at least one instruction to the device.

Embodiments of the present disclosure substantially eliminate or at least partially address the aforementioned problems in the prior art, and provides a textured or corrugated touch surface which produces vibrations when a user performs a touch operation on the surface. Subsequently, the generated vibrations are analyzed to determine a vibration pattern and a controller performs at least one operation in accordance with the vibration pattern.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the present disclosure provided herein, one of ordinary skill in the art will appreciate a variety of ways in which connection or coupling exists in accordance with the aforementioned definition.

The phrases "in an embodiment", "in accordance with an embodiment" and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

If the specification states a component or feature "may", "can", "could", or "might" be included or have a characteristic, that particular component or feature is not required to be included or have the characteristic.

In one aspect, an embodiment of the present disclosure provides an apparatus for recognizing touch operation of a user on a user interface, the apparatus comprising:

a housing including an at least one characteristic surface;

a vibration detector configured to detect vibrations that are generated on interaction of the user with the at least one characteristic surface;

a proximity detector configured to detect deformations that are generated on the interaction of the user with the at least one characteristic surface;

a processor to process the vibrations obtained from the vibration detector to determine a vibration pattern specific to the interaction of the user on the at least one characteristic surface and to process the detected deformation related information to determine a force applied by the user to the at least one characteristic surface;

a controller to identify and process at least one instruction to control at least one operation of a device in accordance with the vibration pattern and the detected deformation; and a communication interface to communicate the at least one instruction to the device.

The apparatus includes a housing on which one or more characteristic surfaces are formed so that the characteristic surfaces act as user interfaces for the user to control one or more operations of a device. In an embodiment, the characteristic surface is a rough surface including one or more design configurations and the user touches his finger over these design configurations to control the operation of the device. In an embodiment, the user can perform the touch operation with a finger, a nail, a pen, or essentially with any object having sufficient hardness, and shape similar to a fingertip.

In an embodiment, the characteristic surface can be made of any material such as a wood, plastic and metal which is readily available. In another embodiment, the characteristic surface may include grooves, protrusions, projections, or other mechanical structures that can be felt by the user when the user performs a touch operation on the characteristic surface.

The characteristic surface exhibits a property of producing vibrations when the user performs the touch operation on one or more portions of the characteristic surface. The vibrations may be produced due to touch or scratch made by the user on the characteristic surface. In an embodiment, different design configuration of the characteristic surface produces respective pattern of the vibrations. For example, a frequency or magnitude of the vibrations may depend on the shape, design or thickness of the elements (e.g., protrusions) disposed on the characteristic surface. When the user slides his finger or hand over a particular design configuration of the characteristic surface, a particular vibration pattern corresponding to the respective configuration is generated.

In an embodiment, the configuration of the characteristic surface may include a set of lines that may extend across the profile of the housing in one direction. In another embodiment, the configuration of the characteristic surface may include at least a first set of lines extending in one direction and a second set of lines extending in opposite direction across the profile of the housing. In an example, the lines may be arranged at least horizontally, vertically, with a leftward slant, or with a rightward slant on the housing.

As the vibration pattern depends on the configuration of the characteristic surface, the configuration may be designed in a way such that a desired vibration pattern may be generated when a user touches his finger on the characteristic surface. In an embodiment, the inter-distance between the lines or depth of these lines, design of the lines, material used for placing these lines on the housing or the material of the housing is selectively chosen to generate a particular vibration pattern when the user touches his finger on the characteristic surface.

The apparatus includes a vibration detector configured to detect vibrations that are generated on interaction of the user with the characteristic surface. In an embodiment, the vibration detector can include a gyroscope, an accelerometer, a ultra sound radar, a magnetometer, and any other vibration sensor configured to capture the vibrations generated due to the user's interaction with the characteristic surface. The vibration detector is configured to detect the vibrations and convert these vibrations into electrical signal which can be a digital or an analogue signal depending on a configuration of the vibration detector.

In an embodiment, the vibration detector is configured to include a microphone for example a micro-electro-mechanical system (MEMS) based microphone to capture the acoustic vibrations when the user touches his hand over the characteristic surface. The movement of the user's hand or finger generates acoustic vibrations due to scratching sound which is captured using the microphone. In an embodiment, the apparatus is a smart phone and the microphone is a microphone used for capturing user's voice during a call. Consequently, the microphone is used as an input device for voice operations of the smart phone and as a user interface to control one or more operations of the smart phone. In another embodiment, the apparatus may include an additional microphone on the smart phone to particularly detect the acoustic vibrations generated due to the user's interaction on the characteristic surface.

In an embodiment, the vibration detector is disposed within the housing at a position approximate to a location of the characteristic surface in order to detect the vibrations when the user interacts with the characteristic surface. In another embodiment, the vibration detector is disposed at a distant position with respect to an originating source of the vibrations. Accordingly, the apparatus is configured to include structure that can transfer the vibrations generated at the interaction area on the characteristic surface to the vibration detector. For example, the apparatus can include an acoustic waveguide for directing the acoustic vibrations to the microphone when the vibration detector is the microphone and is disposed at the distant location relative to the origin of the acoustic vibrations on the characteristic surface. In another example, the apparatus can include a means for forwarding the vibration near the detecting sensor of the apparatus (e.g. a mobile device) so that the microphone can detect the vibrations.

The apparatus includes a processor to process the vibrations obtained from the vibration detector to determine the vibration pattern of the user's interaction on the characteristic surface. In an embodiment, a signal indicating time domain representation of the amplitude of the vibrations is generated using an output obtained from the vibration detector. In another embodiment, a signal indicating a frequency domain representation of the amplitude of the vibrations is generated using an output obtained from the vibration detector. The signals indicate the vibration pattern of the user's interaction on the characteristic surface.

The controller is configured to identify and process at least one instruction to control at least one operation of a device in accordance with the vibration pattern. The vibration pattern can include at least one of a magnitude of the vibration, a resonant frequency of the vibration, and an area of the characteristic surface. In an embodiment, the controller can be configured to control the volume of the speaker on detecting that the user has interacted with the characteristic surface disposed on an outer surface of a speaker. In another embodiment, the characteristic surface can replace the tactile push button of the mobile phone and subsequently, the controller can be configured to operate the mobile device depending on the vibrations produced due to the user's interaction on the characteristic surface.

According to an embodiment, the proximity detector is selected from a group of an ultra sound radar, an infrared radar, a millimeter wave radar, a microwave radar. According to another embodiment, the force is determined by using a value representing the amount of deformation and physical properties of the at least one characteristic surface. The physical properties may comprise at least one of flexibility, surface tension, force per area needed to actuate the surface, elasticity, resilience. According to yet further embodiment, the apparatus also comprises a heat sensor to detect applied heat on the at least one characteristic surface.

According to embodiment the vibration detector is selected from a group of an ultra sound radar, an infrared radar, a millimetre wave radar, a microwave radar. According to other embodiment radar type of detectors are used to detect and monitor movements of a finger/bodypart (or pointer used by the user) of the user along the surface of the apparatus i.e. thru the surface. In said embodiment the touch is detected indirectly by analysing movement pattern of a finger of the user along the characteristic surface using the vibrator detector or the proximity detector. As an example if a surface comprises pyramid shape protrusions the finger would follow the pyramid shape protrusions thus the apparatus can conclude that the finger was touching the surface with said type of protrusion. This embodiment enables to detect touching without using audio. Further the embodiment of detecting finger (or other body part such as hand) with proximity detector enables to analyze deformations caused by touching (for example by pressing with finger) to the apparatus. Deformation can in this context refer to molding and forming a shape from the apparatus. As an example apparatus would could be in this alternative/additional embodiment molding clay and detector inside of the molding clay could be microwave or millimeter-wave radar. This enables to detect which shape has been formed with the molding clay.

In one embodiment the apparatus might comprise a detector or sensor such as micro and/or millimeter wave radar inside of the apparatus. The detector can be used to detect movement of a finger or other pointer along the characteristics surface of the apparatus. The detected movements of the finger have correlation with the form of the characteristic surface thus detection can be used to determine which part of the surface user touches.

In an embodiment, the apparatus can be in a form of a three dimensional structure configured to be used as a controlling device for performing one or more operations of other equipment. For example, the three dimensional structure can be a pyramid, a cube, a square, a rectangular, spherical or any combination thereof. The three dimensional structure can include different characteristic surface on each of its outer surface so that the user can interact with these characteristic surfaces in order to perform corresponding operations. For example, each triangular surface of the pyramid may have a respective characteristic surface so that the controller can be configured to perform the operation specific to the characteristic surface of the pyramid.

In an embodiment, the apparatus can be a protecting case of a mobile device. The mobile device may include a cellular phone, a smart phone, a laptop computer, a digital broadcasting terminal, personal digital assistants (PDA), a portable multimedia player (PMP), a navigation system and/or other electronic devices. Further, the housing of the protecting case includes one or more corrugated surfaces through which the user may interact. Such interaction will generate vibrations corresponding to the specific corrugated surface of the protecting case. For example, the vibration pattern for the first corrugated surface is different from the vibration pattern of a second corrugated surface. The vibration detector is configured to detect the vibrations and subsequently, the processor is configured to discriminate the vibration pattern of the first and second corrugated surfaces. Further, the controller controls the operation of the mobile device depending on the presence of the user's interaction in the first or second corrugated surfaces. For example, if the function associated with the first corrugated device is to pick up a call, the controller is configured to pick up a call on detecting a vibration pattern indicative of the user interaction with the first corrugated surface.

Figure 2:
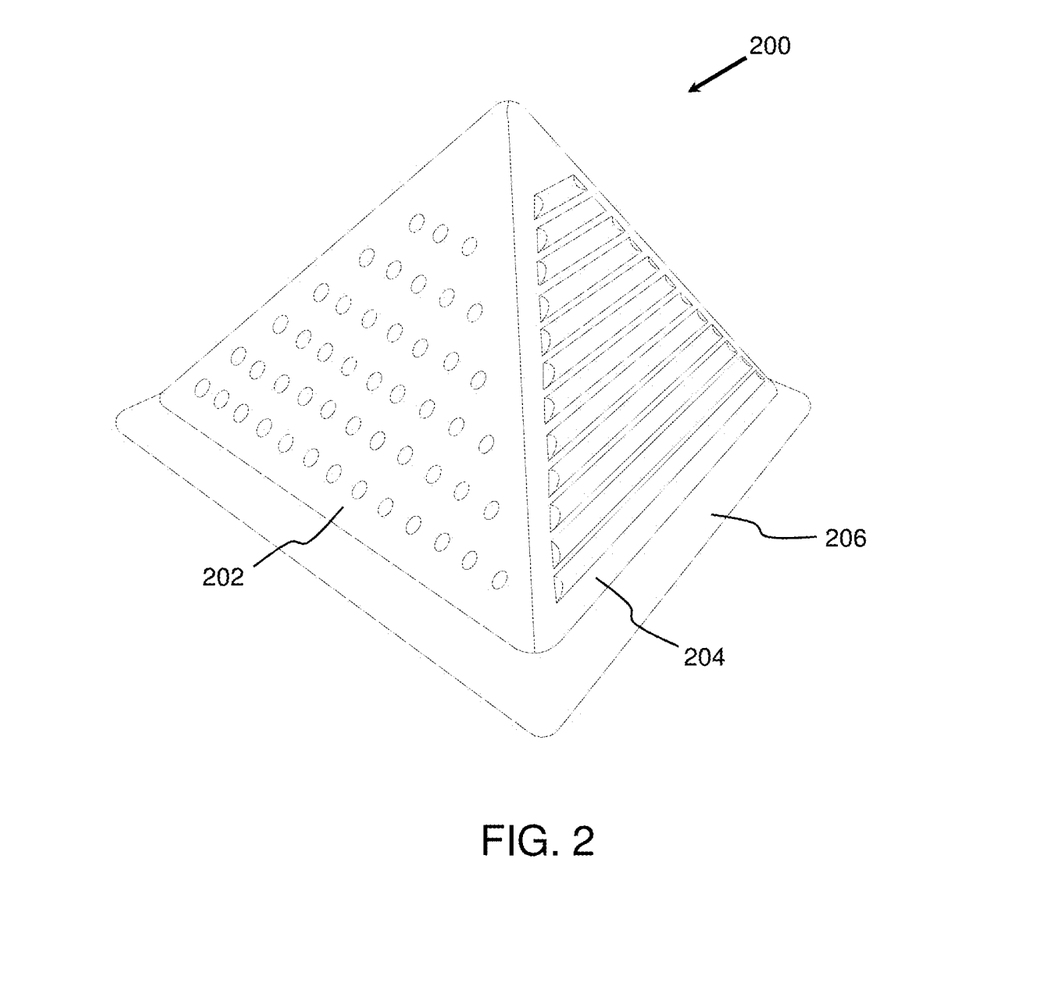
FIG. 2 is an example illustration of an apparatus for recognizing touch operation on a three dimensional surface, in accordance with an embodiment of the present disclosure.

In one embodiment, the vibration sensor, such as a gyroscope or a microphone, are physically separate from the characteristic surface. As an example, the apparatus of FIG. 200 comprises only the characteristic touch surface, and the means of detection is implemented with a separate device, such as smartphone, capable of detecting the touch sounds with its microphone and suitable software.

The present disclosure provides several advantages. For example, the apparatus as disclosed herein provides a robust physical touch control interface which is capable of recognizing a variety of actions wherein the touch surface does not need to have any electrical properties. Further, the apparatus can be hermetically sealed and consequently, being operable under water. The outer surface of the apparatus being made of plastic, wood or other robust material has a very high resistance to wear and tear; and as a result the apparatus becomes economical.

DETAILED DESCRIPTION OF THE DRAWINGS

Figure 1:
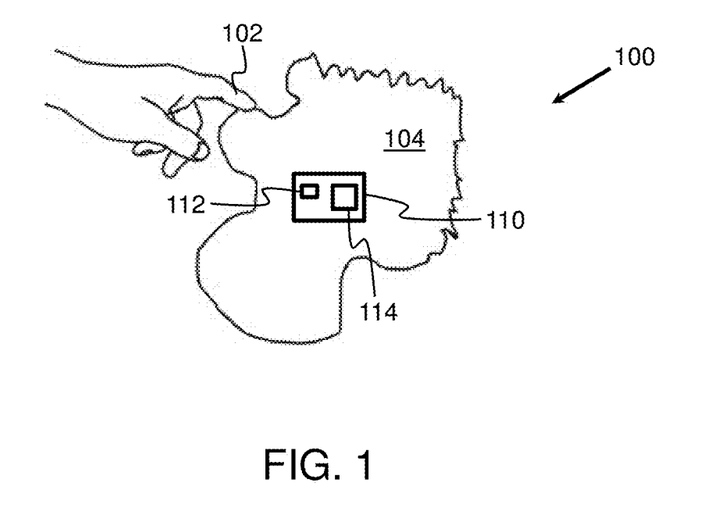
FIG. 1 is a schematic illustration of an apparatus for recognizing touch operation of a user on a user interface, in accordance with an embodiment of the present disclosure.

Referring to FIG. 1, illustrated is an example illustration of an apparatus 100 for recognizing touch operation of a user's hand 102 on an outer surface 104. The apparatus 100 can be configured as a mechanically hollow apparatus or can be filled with a light material. As illustrated, different portions of the outer surface 104 have different haptic surfaces for example, corrugated or textured surfaces. These portions of the outer surface 104 generate different vibration patterns when the user touches on the respective portions of the outer surface 104. The apparatus 100 includes an electronic module 110 configured to include a microphone 112 for determining acoustic vibrations which may generate when the user touches on the respective portion of the outer surface 104. The electronic module 110 includes a controller 114 configured to discriminate the vibrations indicating swiping operation on the respective portions of the outer surface 104. On detection of the swiping operation within a particular portion of the outer surface 104, the controller 114 is configured to perform an operation associated with the respective vibration pattern.

Referring to FIG. 2, illustrated is an example illustration of an apparatus 200 for recognizing touch operation in accordance with an embodiment of the present disclosure. As illustrated, the apparatus 200 has a pyramid shape having different corrugated areas on outer surfaces of four sides of the pyramid respectively. A first outer surface 202 has a plurality of protrusions extending away from the first outer surface 202. The protrusions on the outer surface 202 are substantially circular in shape and aligned uniformly within the outer surface 202. A second outer surface 204 has a plurality of projections extending away from the outer surface 204, such that each of the projection is substantially parallel to other projection. Further, the pyramid is supported on a base 206 and an electronics module (not shown in FIG. 2) is disposed inside the pyramid. Alternatively or additionally there can be a detector inside of the apparatus 200 for detecting movements of a finger/pointer along the outer surface of the apparatus 200. Since the user is moving finger along the surface the finger movement detection can be used to determine if user is touching the first outer surface 202 or the second outer surface 204.

Figure 3:
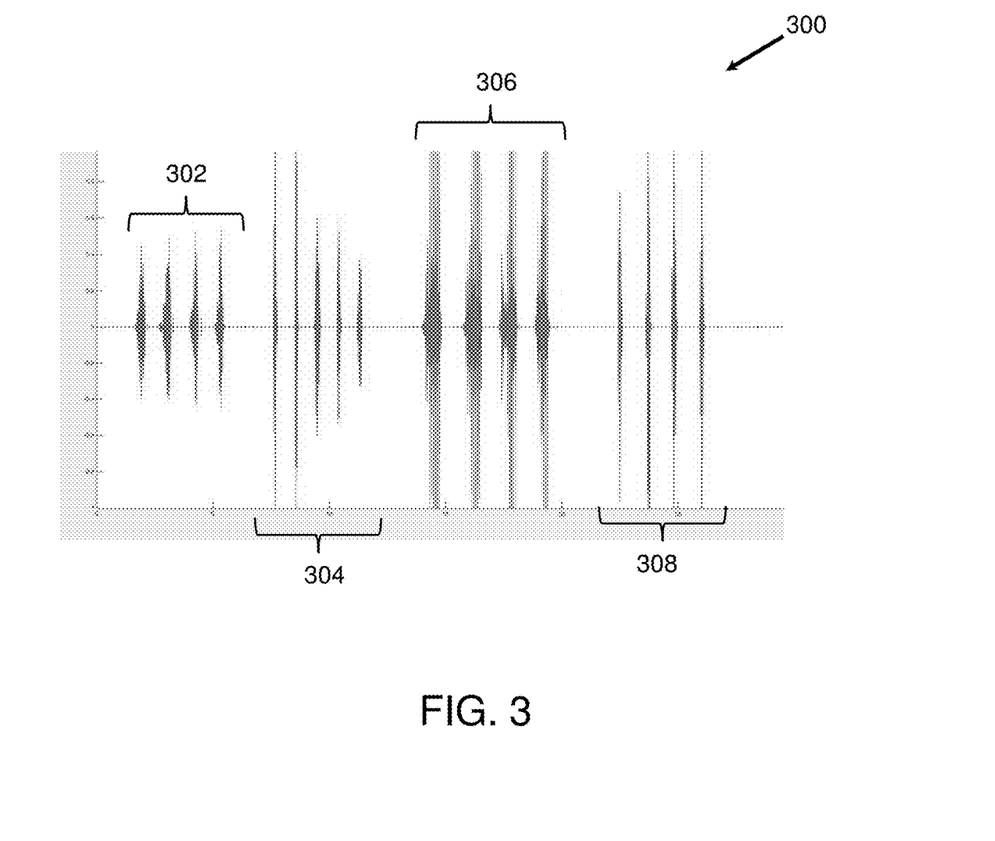
FIG. 3 is an example illustration of a graph illustrating time domain analysis of the user interaction on different outer surfaces of the three dimensional surface, in accordance with an embodiment of the present disclosure.

Referring to FIG. 3 in conjunction with FIG. 2, a graph illustrating time domain analysis of the user interaction on the different outer surfaces of the pyramid. The graph 300 discloses a plot of amplitude of the vibrations received at a vibration detector for a defined time period. A portion 302 and 304 of the graph indicates the vibration pattern being detected by the vibration detector when the user interacts with the first outer surface 202 and the second outer surface 204 respectively. A portion 306 and 308 of the graph indicates the vibration pattern being detected by the vibration detector when the user interacts with a third outer surface and a fourth outer surface (not shown in FIG. 2) of the pyramid respectively.

Figure 4:
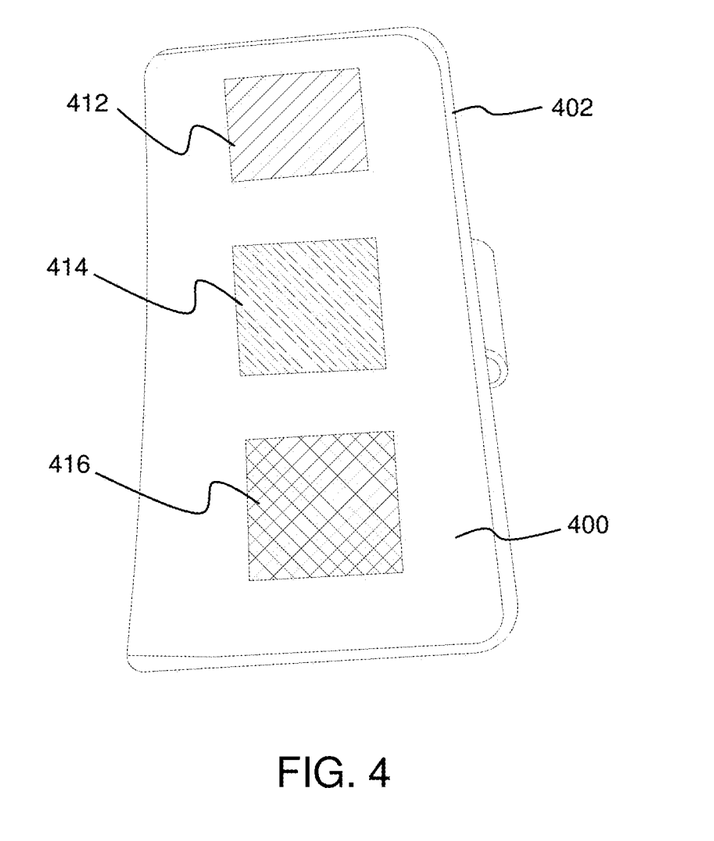
FIG. 4 is an example illustration of an outer case of a smart phone configured to provide a user interface, in accordance with an embodiment of the present disclosure.

Referring to FIG. 4, illustrated is an example illustration of an outer case 400 of a smart phone 402 configured to operate as a user interface in accordance with an embodiment of the present disclosure. The outer case 400 includes there corrugated surfaces such as a corrugated surface 412, a corrugated surface 414 and a corrugated surface 416. Each of these corrugated surfaces has its own respective acoustic vibration pattern when a user performs a touch operation on the corresponding corrugated surface. The smart phone 402 includes a microphone (not shown in FIG. 4) to detect the acoustic vibrations when the user performs the touch operation on any of these corrugated surfaces.

Figure 5A:
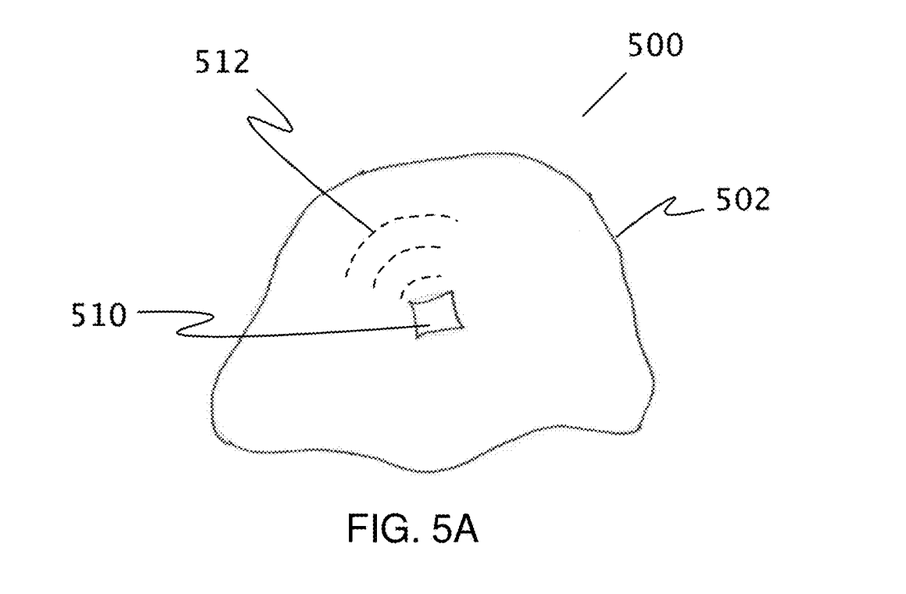
FIGS. 5A and 5B are an example illustration of an apparatus for recognizing touch and touch related deformations of the apparatus.
Figure 5B:
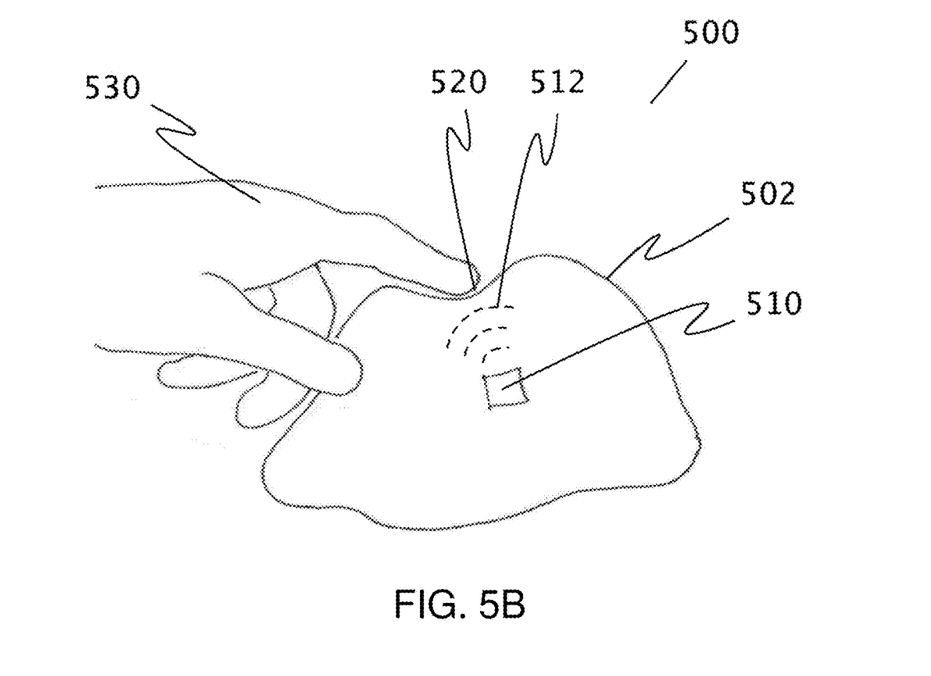

FIG. 5A is an example illustration of an apparatus 500 with housing 502 having a characteristics outer surface. The housing 502 is made from elastic material which deforms when a force is applied to the characteristic surface of the housing 502. The apparatus 500 comprises a proximity sensor 510 configured to measure the distance between the proximity sensor 510 and the housing 502 using ultrasonic waves 512. FIG. 5B is an example illustration when a user is touching with a hand 530 the housing 502 of the apparatus 500 (thus applying a force to the surface of the apparatus 500). As indicated in FIG. 5B, deformation of the housing material takes place at least at a point of contact 520 between a finger of the hand 530 and the surface of the housing 502. The proximity sensor 510 is configured to measure the distance between the proximity sensor 510 and the housing 502 using ultrasonic waves 512. The difference in distance between the scenarios of FIG. 5A and FIG. 5B and information related to physical properties of the housing can be used to determine the force applied by the finger of the hand 530 to the contact point 520.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. An apparatus for recognizing touch operation of a user on a user interface, the apparatus comprising:
    a housing including an at least one characteristic surface;
    a vibration detector configured to detect vibrations that are generated on interaction of the user with the at least one characteristic surface;
    a proximity detector configured to detect deformations that are generated on the interaction of the user with the at least one characteristic surface;
    a processor to process the vibrations obtained from the vibration detector to determine a vibration pattern specific to the interaction of the user on the at least one characteristic surface and to process the detected deformation related information to determine a force applied by the user to the at least one characteristic surface;
    a controller to identify and process at least one instruction to control at least one operation of a device in accordance with the vibration pattern and the detected deformation; and
    a communication interface to communicate the at least one instruction to the device.

2. An apparatus as claimed in claim 1, wherein the vibrations include acoustic vibrations and the vibration detector is a microphone.

3. An apparatus as claimed in claim 2, further comprising an acoustic waveguide for directing the acoustic vibrations to the microphone.

4. An apparatus as claimed in claim 1, wherein the vibrations include mechanical vibrations and the vibration detector includes at least one of an ultrasound radar and an accelerometer.

5. An apparatus as claimed in claim 1, further comprising a rigid structure for forwarding the vibrations to a cover of a smart phone.

6. An apparatus according to claim 1, wherein the proximity detector is selected from a group of an ultra sound radar, an infrared radar, a millimeter wave radar, a microwave radar.

7. An apparatus according to claim 1, wherein the force is determined by using a value representing the amount of deformation and physical properties of the at least one characteristic surface.

8. An apparatus according to claim 7, wherein the physical properties comprise at least one of flexibility, surface tension, force per area needed to actuate the surface, elasticity, resilience.

9. An apparatus according to claim 1, wherein the apparatus further comprises a heat sensor to detect applied heat on the at least one characteristic surface.

10. An apparatus as claimed in claim 1, wherein the vibrations include mechanical vibrations and the vibration detector is selected from a group of an ultra sound radar, an infrared radar, a millimeter wave radar, a microwave radar.

11. An apparatus as claimed in claim 1, wherein the touch is detected by analyzing movement pattern of a finger of the user along the characteristic surface using the vibrator detector or the proximity detector.

* * * * *